Patented July 7, 1953

2,644,835

UNITED STATES PATENT OFFICE 2,644,835

COUPLED PRODUCTS

Elbert C. Ladd, Passaic, and Herbert Sargent, Wood-Ridge, N. J., assignors to United States Rubber Company, New York, N. Y., a corporation of New Jersey No Drawing. Application June 5, 1947,
Serial No. 752,820

8 Claims. (Cl. 260—465.7)

This invention relates to the coupling of certain non-aromatic compounds having terminal trihalomethyl radicals (—CX₃ where the X's are chlorine and/or bromine). We have discovered that these compounds can be partially dehalogenated with hydrogen at the trihalomethyl group with concurrent coupling together of two of the resulting dehalogenated residues to form a series of useful chemicals, a number of them being of novel character.

We have found that, if the trihalomethyl radical is the terminal group of a chain of at least three carbon atoms, said chain being devoid of aromatic hydrocarbon substituents, coupled products containing an aliphatic chain of at least six carbon atoms, including the group

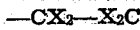

can be prepared without difficulty.

The reaction is carried out in the presence of a hydrogenation catalyst and a hydrogen halide acceptor, and may be illustrated as follows:

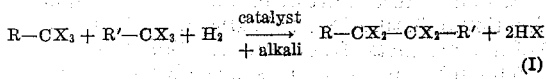
(I)

R and R' are similar or dissimilar non-aromatic groups, each containing a chain of at least two carbon atoms and need not be wholly hydrocarbon but can contain various hetero elements, e. g., sulfur, oxygen, halogen, nitrogen, phosphorus, silicon, etc. R and R' are exemplified by an aliphatic group containing at least two carbon atoms, e. g., ethyl, propyl, butyl, isobutyl, amyl, iso-amyl, sec.-amyl, hexyl, heptyl, octyl, nonyl, decyl, hendecyl, dodecyl, vinyl, allyl, crotyl, cyclohexyl, cyclopentyl, 2-cyclohexylethyl; cycloalkenyl, e. g., 2-cyclohexenyl. Examples of non-hydrocarbon substitutuents which may be contained in R are fluorine, chlorine, bromine, hydroxy, keto, carboxyl, alkoxy, carbalkoxy, formyl, nitrilo, acyloxy, amino, amido, alkylmercapto, sulfo, phosphato, and silicyl.

The chemicals to be coupled by this invention are chiefly those producible by subjecting a nonaromatic olefinic compound to reaction with a halomethane of the formula Y—CX₃ (Y being hydrogen or halogen; and each X being chlorine or bromine), in the presence of a source of free radicals, such as organo-metal compounds, or ethylene polymerization catalysts such as organic peroxides, or actinic radiation.

Such class of trihalomethyl compounds includes 1,1,1-trichloropropane, 1,1,1-trichlorobutane, 5,5,5-trichloropentene-1, 1,1,1-trichlorononane, 3,3,3-trichloropropene-1, 4,4,4-trichlorobutene-1, 5,5,5-trichloropenene-2, 1,1,1,3-tetrachloropropane, 1,1,1,5-tetrachloropentane, 1,1,1-trichlorohexane, 1,1,1,7-tetrachloroheptane, 1,1,1-trichloro-3-bromooctane, 1,1,1,3-tetrachlorodecane, 1,1,1-trichlorohendecane, 1,1,1,3-tetrachlorotridecane, 1,1,1-trichlorododecane, 1,1,1-trichloro-3-bromopropane, 1,1,1,3-teterachloro-2-methylbutane, 1,1,1-trichloro-3-bromo-4-fluorobutane, 1,1,1,3-tetrachloro - 3 - methylbutane, 1,1,1-trichloro-3 - bromo - 3 - methylpentane, 1,1,1,3-tetrabromononane, 1,1,1,-trichloro-5-bromopentene-3, 1-trichloromethyl-2-bromocyclopentane, 1-trichloromethyl-2-chlorocyclohexane, 1,1-di-chloro-1,3 - dibromo - 3 - methylbutane, 4,4,4-trichlorobutyl acetate, 1,1,1-trichloro-2-methyl-2-hydroxypropane, 1,1,1 - tribromo - 2-methyl-2-hydroxypropane, 2-bromo-4,4,4-trichlorobutyl ethyl ether, 2,4,4,4-tetrachlorobutanol-1, 2,4,4,4-tetrachloro-2-methyl-butanol-1, 5,5,5-trichloro-3-bromo-2-pentanone, 6,6,6-trichlorohexanoic acid, 12,12,12-trichlorododecanoic acid, 3-bromo-5,5,5-trichloropentanenitrile, 1,3,3,3-tetrachloropropyl butyrate, methyl alpha-bromo-gamma-trichlorobutyrate, alpha-bromo-gamma-trichlorobutyraldehyde, alpha-bromo-gamma-trichlorobutyramide, 10,12,12,12-tetrachlorododecanoic acid methyl ester, 4,4,4-trichlorobutyl dodecanoate, 2,4,4,4-tetrachlorobutyl amine, 2-bromo-4,4,4-trichlorobutyl ethyl sulfide, 4,4,4-trichlorobutanesulfonic acid, 2-bromo-4,4,4-trichlorobutyl triethyl silicane, and 2-bromo-4,4,4-trichlorobutyl diethyl phosphate.

When R and R' are identical, the coupled compounds resulting from the reaction are symmetrical. When R and R' are unlike, coupled compounds are formed which are not symmetrical and which may contain different functional groups corresponding to those present in R and R', accompanied by the formation of the symmetrical coupled compounds derived from RCX₃ and R'CX₃, respectively.

The coupling reaction is not one of general application to all trihalomethyl compounds. For instance, experiment has shown that hydrogenation of 3-trichloro - 2 - hydroxypropylpyridine hydrochloride yields only the 3,3-dichloro-2-hydroxypropylpyridine; no "coupling" was detected. Further, neither chloral (Cl₃C—CHO) nor trichloroacetic acid (Cl₃C·COOH) could be made to couple under the conditions used in our reaction.

In the course of the hydrogenation, hydrogen halide is formed, and to absorb, remove or neutralize the same, there is provided a hydrogen halide acceptor. The term "hydrogen halide acceptor" herein, therefore means any chemical which will absorb or react with HX (X being chlorine or bromine) to remove or neutralize it, the most commonly known acceptors being alkali such as ammonia or alkali metal hydroxide, sodium acetate, etc. We have found that in the absence of hydrogen halide acceptor, virtually no coupling reaction occurs. Any well-known hydrogenation catalyst, such as Raney nickel, platinum, palladium, their oxides, such as platinum oxide, etc. may be used.

The quantity of the hydrogenation catalyst is not critical. Amounts on the order of 0.3 to 7.0 grams per mole of the trihalomethyl compound, have proven adequate, although larger or smaller amounts could be used.

The amount of the hydrogen halide acceptor is preferably at least equivalent to the theoretical quantity of hydrogen halide evolved or liberated during the reaction.

The trihalomethyl compounds may contain more than a single trihalomethyl group, e. g., 1,6-bis(trichloromethyl)-2,5-dibromohexane. In such a case, both of the trihalomethyl groups may undergo the coupling reaction of our invention with like groups in other like molecules to yield linear polymeric materials containing more than two coupled units derived from the original bis-trihalomethyl compound.

In many cases the coupled products will react further with hydrogen, as illustrated by:

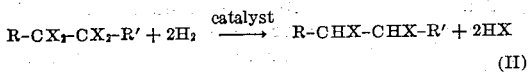

and

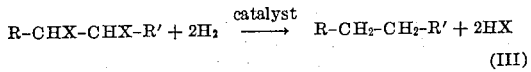

By control of the amount of hydrogen consumed, either or both of reactions II and III may, if desired, be combined with the initial coupling reaction (I), as illustrated with 1,1,1,5-tetrachloropentane:

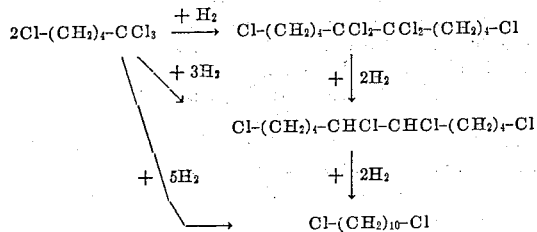

It is remarkable that the coupling reaction of such as 1,1,1,5-tetrachloropentane, which contains an additional halogen substituent remote from the trichloromethyl group (i. e., separated by more than one carbon atom), involves only the halogen atoms of the trihalomethyl group, and that in the subsequent hydrogenation, this remote halogen substituent likewise remains unaffected.

In addition to reactions II and III, reactions IV and V resulting in the formation of olefinic compounds take place by consumption of one molecule of hydrogen for one molecule of the initial organic reactant in each of reactions II and III, as shown below, and the olefinic compounds thus formed are isolatable, and are capable of undergoing further hydrogenation to form the same saturated compounds that are formed in reaction III above.

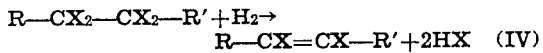

and

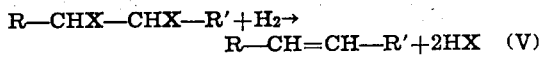

Such olefinic compounds have been isolated in some instances, as illustrated in Examples 4 and 17 herein.

The hydrogenation reactions may be carried out simply by shaking a trihalogenomethyl compound or a mixture of two trihalogenomethyl compounds with hydrogen in the presence of both a hydrogenation catalyst and a hydrogen halide acceptor.

In the reactions, the absorption of hydrogen usually proceeds smoothly and rapidly at ordinary room temperature, i. e., 20–25° C., and at atmospheric pressure; the use of elevated temperatures and super-atmospheric pressures are contemplated within the scope of the invention, but are usually unnecessary and may, in fact, be economically undesirable.

The reactions are facilitated by an inert diluent, such as water, and unreactive organic solvents, particularly those capable of dissolving the alkali, for example, hydrophilic solvents such as methanol, ethanol, etc. The reactions frequently proceed more rapidly in the presence of an organic diluent, but the yields of the desired products are often lower than those from the corresponding reaction conducted in the presence of water.

At the end of a reaction, that is, when approximately the desired theoretical amount of hydrogen has been absorbed, the organic components of the reaction mixture are extracted with an appropriate solvent and the desired product or products are isolated from the extract by methods well-known to the art of organic chemistry, e. g., fractional distillation, or in the case of very high-boiling products, fractional crystallization.

The following examples are given to further illustrate the invention in detail:

EXAMPLE 1

To a mixture of 63 gms. of 1,1,1,5-tetrachloropentane and 100 mls. of alcoholic ammonia (62 gms./liter of ethanol) is added a pre-reduced suspension of 0.3 gm. of platinum oxide in 20 mls. of absolute ethanol containing 0.1 ml. of glacial acetic acid and prepared by the conventional procedure as described by Adams et al. in "Organic Syntheses" collected vol. I, by Gilman and Blatt. The mixture is enclosed in a vesel whose sole outlet is connected by a flexible tube to a supply of hydrogen at 25° C. and atmospheric pressure. The reaction mixture is then shaken vigorously at room temperature for 2 hours during which time approximately 5 liters of hydrogen are absorbed. The reaction mixture is diluted with 3 volumes of water, and extracted with commercial petroleum ether. The extract is dried over anhydrous sodium sulfate and fractionally distilled to remove the solvent and unreacted starting material. The residue is recrystallized from 95% ethanol to yield 22.5 gms. of the new compound 1,5,5,6,6,10-hexachlorodecane, M. 84.5–85.5° C.

*Analysis.*—Found: Cl, 61.11%; theory: 61.10%.

EXAMPLE 2

The coupled product of Example 1 can be further hydrogenated as follows:

Thirteen and ninety-six hundredths gms. of the hexachlorodecane prepared in Example 1 above, is mixed with a pre-reduced suspension of 0.2 gm. of platinum oxide in 10 mls. of ethanol and 43.5 mls. of an alcoholic ammonia solution 62 gms./liter). The resulting mixture is hydrogenated at room temperature and atmospheric pressure for 24 hours during which 4.66 liters of hydrogen are absorbed. The reaction mixture is diluted with 4 volumes of water and extracted with several portions of petroleum ether. The extract is dried and evaporated to remove the solvent. Fractional distillation of the residue yields 7.0 gms. of the known compound 1,10-dichlorodecane, B. 112–3° C./3 mm.

*Analysis.*—Found: Cl, 34.2%; theory, 33.6%.

EXAMPLE 3

This illustrates a combination of the coupling reaction and further hydrogenation of the coupled product.

A mixture of 56 gms. of 1,1,1,5-tetrachloropentane, 220 mls. of alcoholic ammonia (62 gms./liter') and a previously reduced suspension of 0.3 gm. of platinum oxide in 23 ml. of absolute ethanol containing 0.1 ml. of glacial acetic acid, is vigorously agitated at room temperature for 4 hours under an atmosphere of hydrogen during which time 13 liters of hydrogen are absorbed. The reaction mixture is diluted with water and extracted with petroleum ether. The extract is dried and then evaporated to remove the solvent. The residue, upon fractional distillation, yields 11 gms. of 1,10-dichlorodecane, B. 112–114° C./4 m., together with a smaller amount (5.2 gms.) of a new compound believed to be 1,5,6,10-tetrachlorodecane, B. 150–4° C./3.4 mm.

*Analysis.*—Found: Cl, 50.43%; theory, 50.75%.

The 1,10-dichlorodecane obtained above was converted to the corresponding known 1,10-decanediol, M. 70.0–70.8° C., through the diacetate.

EXAMPLE 4

To a mixture of 73 gms. of 1,1,1,3-tetrachloropropane and 110 mls. of alcoholic ammonia (62 gms./liter) is added a pre-reduced mixture of 0.3 gm. of platinum oxide and 10 mls. of methyl alcohol containing 0.1 ml. of glacial acetic acid. The mixture is agitated vigarously and hydrogenated at 25° C. and atmospheric pressure. The reaction becomes somewhat exothermic as it proceeds and at the end of 2.45 hours it has absorbed 5.5 liters of hydrogen.

The hydrogenated mixture is diluted with 2 volumes of water and extracted with several portions of petroleum ether. The extract is dried and then evaporated to remove the solvent, after which the residue is recrystallized from ethanol to yieud 20 gms. of the new compound 1,3,3,4,4,6-hexachlorohexane, a white solid melting at 106–106.3° C.

*Analysis.*—Found: Cl, 71.41%; theory, 72.8%.

Distillation of the mother liquor from the above recrystallization yields 15 gms. of the new compound 1,3,4,6-tetrachloro-3-hexene, B. 85–88° C./3 mm.

*Analysis*

|    | Found   | Theory  |
|----|---------|---------|
| C  | 32.91%  | 32.4 %  |
| H  | 3.56%   | 3.56%   |
| Cl | 63.70%  | 64.0 %  |

EXAMPLE 5

This example further illustrates the ease with which the coupling reaction and hydrogenation of the coupled product can be combined.

To a mixture of 36.5 gms. of 1,1,1-tetrachloropropane and 130 mls. of alcoholic ammonia (50 gms./liter) is added a pre-reduced mixture of 0.3 gm. of platinum oxide and 20 mls. of absolute ethanol containing 0.2 ml. of glacial acetic acid. When shaken vigorously at room temperature in an atmosphere of hydrogen, the mixture absorbs approximately 7.3 liters of hydrogen at atmospheric pressure within 2.5 hours. The reaction mixture is diluted with 2 volumes of water, extracted with several portions of petroleum ether and the latter, after drying, is evaporated to remove the solvent. Upon fractional distillation of the residue 11.2 gms. of the desired 1,3,4,6-tetrachloro-3-hexene are obtained, B. 85–88° C./3 mm.; M. 52–53° C. after recrystallization from 95% ethanol.

The same 1,3,4,6-tetrachlorohexene is also obtained by the declorination of the 1,3,3,4,4,6-hexachlorohexane of Example 4 by means of zinc dust and ethanol.

EXAMPLE 6

A mixture of 45.3 gms. of 1,1,1-trichloro-3-bromopropane, 110 mls. of alcoholic ammonia (62 gms./liter) and a pre-reduced suspension of 0.3 gm. of platinum oxide in 20 mls. of absolute ethanol containing 0.2 ml. of glacial acetic acid is vigorously agitated in the presence of hydrogen at room temperature and atmospheric pressure until it has absorbed approximately 4.92 liters of hydrogen. The reaction mixture is diluted with water, extracted with petroleum ether and the extract is dried over anhydrous sodium sulfate. Upon evaporation of the extract a residue is obtained which upon recrystallization from methanol yields 11.3 gms. of the new compound 1,6-dibromo-3,3,4,4-tetrachlorohexane, M. 140–1° C.

*Analysis.*—Found: Halogen as Cl, 55.37%; theory, 55.75%.

Distillation of the mother liquor from the above recrystallization yields 6 gms. of the new compound believed to be 1,6-dibromo-3,4-dichlorohexene, B. 110–115° C./2.5 mm., which upon recrystallization from absolute ethanol melts at 56.5° C.

*Analysis.*—Found: Cl, 45.03%; theory, 45.3%.

EXAMPLE 7

Thirty-nine and two-tenths grams of 1,1,1,3-tetrachlorobutane are mixed with 110 mls. of alcoholic ammonia solution and an alcohol suspension of 0.3 gm. of platinum oxide as in Example 6. The resulting mixture is agitated vigorously in an atmosphere of hydrogen for 0.5 hour, at the end of which time it has absorbed 2 liters of hydrogen. The mixture is diluted with 4 volumes of water, extracted with several portions of petroleum ether and the extract is dried. After evaporation of the solvent the residue is recrystallized from ethanol to yield 16.5 gms. of the new compound 2,4,4,5,5,7-hexachlorooctane, M. 87.5–88° C.

*Analysis.*—Found: Cl, 66.31%; theory: Cl, 66.4%.

EXAMPLE 8

Eighty-eight grams of 1,1,1,3-tetrachloro-3-methyl butane are hydrogenated at atmospheric pressure at room temperature in the presence of 110 mls. of alcoholic ammonia solution and an alcoholic suspension of 0.3 gm. of platinum oxide as in Example 6. The reaction mixture absorbs 5.4 liters of hydrogen in the course of 2 hours. The reaction mixture is purified as in Example 6 to yield 62.8 gms. of the new compound 2,4,4,5,5,7-hexachloro-2,7-dimethyloctane, M. 109–109.5° C.

*Analysis.*—Found: Cl, 60.95%; theory: 61.10%.

EXAMPLE 9a

A mixture of 44.0 gms. of 1-trichlorononane, 60 mls. of alcoholic ammonia (62 gms. NH₃/liter alcohol) and a pre-reduced suspension of 0.3 gm. of platinum oxide in 10 mls. of ethanol is shaken with hydrogen at room temperature and atmospheric pressure. At the end of 30 minutes, approximately 1.7 liters of hydrogen have been absorbed. The reaction mixture is purified as in previous examples to yield 14 gms. of 9,9,10,10-tetrachlorooctadecane, boiling in the range 178–82° C./0.7 mm. Upon recrystallization from a mixture of acetone and ethanol the compound melts at 34.5–35° C.

*Analysis.*—Found: Cl, 35.76%; theory: 36.20%.

EXAMPLE 9b

Forty-six and four tenths grams of 1-trichlorononane are mixed with 270 mls. of an ethanol solution containing 4.27 moles of ammonia per liter together with a pre-reduced suspension of 1.35 gms. of platinum oxide in 25 mls. of absolute ethanol containing 2.0 mls. of glacial acetic acid. The mixture is shaken vigorously in an atmosphere of hydrogen at 25° C. for 2 hours during which time approximately 6.77 liters of hydrogen are absorbed. The reaction mixture is diluted with 2 volumes of water and extracted with several portions of petroleum ether. The extract is dried and then evaporated to remove the solvent. Fractional distillation of the residue in vacuo yields 11 gms. of the new compound 9,10-dichloro-octadecane boiling in the range 165–170° C./1 mm.

EXAMPLE 10a

A mixture of 95.2 gms. of 1,1,1,7-tetrachloroheptane, 110 mls. of ethanol containing 0.4 mole of ammonia and a pre-reduced suspension of 0.3 gm. of platinum oxide in 10 mls. of ethanol is vigorously agitated in an atmosphere of hydrogen at room temperature and atmospheric pressure. At the end of one hour, approximately 4 liters of hydrogen have been absorbed in the reaction mixture. The reaction mixture is then diluted with 3 volumes of water, extracted with petroleum ether, dried and distilled to remove unreacted starting materials. The residue, amounting to 41 gms., is recrystallized from a 50:50 mixture of alcohol and acetone to yield the pure 1,7,7,8,8,14-hexachlorotetradecane, M. 57–58° C.

*Analysis.*—Found: Cl, 51.46%; theory: 52.60%.

EXAMPLE 10b

A mixture of 38 gms. of the hexachlorotetradecane of Example 10a, 155 mls. of ethanol containing 0.4 mole of ammonia and a pre-reduced suspension of 0.3 gm. of platinum oxide in 10 mls. of ethanol is agitated vigorously at room temperature in an atmosphere of hydrogen for 5 hours during which time approximately 9.3 liters of hydrogen are absorbed. The reaction mixture is diluted with 2 volumes of water, extracted with petroleum ether and, after drying, the extract is distilled to remove the solvent and unreacted starting materials together with 20.5 gms. of the known compound 1,14-dichlorotetradecane, B. 140–5° C./1 mm. Upon recrystallization from ethanol the compound melts at 39.5–40° C.

*Analysis.*—Found: Cl, 26.8%; theory: 26.6%.

The 1,14-dichlorotetradecane prepared above is particularly useful as an intermediate for the synthesis of perfumes. Thus, for example, the dichloro compound can be converted to cyclopentadecanone through the dinitrile. Likewise, 1,14-dichlorotetradecane can be converted to the 15-hydroxypentadecanoic acid and thence to the lactone.

EXAMPLE 11

Seventy-one grams of 1,1,1 - trichloro - 2-hydroxy-2-methylpropane hydrate ("chloretone") is hydrogenated in the presence of 110 mls. of alcoholic ammonia solution and a suspension of 0.3 gm. of platinum oxide as in Example 6. At the end of 2 hours the reaction mixture has absorbed 5 liters of hydrogen at atmospheric pressure. The reaction mixture is diluted with 3 volumes of water, extracted with a 50:50 mixture of petroleum ether and diethyl ether and the extract is then dried. Upon evaporation of the solvent a crystalline residue is obtained which upon recrystallization from petroleum ether yields 10 gms. of a new 3,3,4,4-tetrachloro-2,5-dimethyl-hexanediol-2,5, M. 156–157.5° C.

*Analysis.*—Found: Cl, 49.0%; theory: 50.0%.

EXAMPLE 12

A mixture of 66.1 gms. of 4-trichlorobutyl acetate, 26 mls. of 15N aqueous ammonia and a pre-reduced suspension of 0.3 gm. of platinum oxide employed in previous examples is agitated vigorously in an atmosphere of hydrogen at room temperature and pressure. At the end of 2.5 hours, 3.85 liters of hydrogen have been absorbed. The reaction mixture is purified as in previous examples to yield 29 gms. of a new compound, the diacetate of 4,4,5,5-tetrachlorooctane-1,8-diol, M. 96–96.5° C.

*Analysis.*—Found: Cl, 38.54%; theory: 38.60%.

When the above hydrogenation is repeated employing 82 mls. of alcoholic ammonia solution (62 gms./liter), only 14 gms. of the diacetoxytetrachloroctane are obtained. This emphasizes our preference for carrying out the hydrogenations in the presence of water as diluent.

EXAMPLE 13

A mixture of 31.7 gms. of the methyl ester of 12-trichlorododecanoic acid, 27 mls. of alcoholic ammonia (62 gms./liter) and a pre-reduced suspension of 0.3 gm. of platinum oxide in 20 mls. of absolute ethanol containing 0.2 ml. of glacial acetic acid is vigorously agitated in an atmosphere of hydrogen for 15 minutes at room temperature during which time 1.3 liters of hydrogen are absorbed. Upon purifying the reaction mixture, as in previous examples, 7.5 gms. of the new compound dimethyl 12,12,13,13-tetrachloro-tetracosanedioate, M. 80.5–81° C. are obtained.

*Analysis.*—Found: Cl, 25.16%; theory: 25.14%.

The mother liquor from the crystallization of the above tetrachloro-acid ester is further hydrogenated in the same manner until no further hydrogen is absorbed at room temperature and atmospheric pressure. From this reaction mixture is isolated dimethyl tetracosanedioate, M. 73–73.5° C.

EXAMPLE 14

A mixture of 29 gms. of 3,3,3-trichloropropene-1, a solution of 0.2 mole of ammonia in 55 ml. of ethanol and a pre-reduced suspension of 0.3 gm. of platinum oxide in 20 ml. of ethanol containing 0.2 ml. of glacial acetic acid is hydrogenated at atmospheric pressure and room temperature for 2 hours during which time 2.6 liters of hydrogen are absorbed. The reaction mixture is diluted with 2 volumes of water, extracted with several portions of petroleum ether, and the extract is dried. The solvent is then evaporated from the extract and the residue is fractionally distilled to yield 12.5 gms. of the new compound 3,3,4,4-tetrachlorohexadiene-1,5, B. 48–50° C./1 mm. The compound absorbs bromine slowly.

*Analysis.*—Found: Cl, 64.20%; theory: 64.6%.

The preceding examples have disclosed only the synthesis of symmetrical compounds by the coupling reaction of our invention. However, it is likewise possible to prepare unsymmetrical compounds as illustrated in the following example:

EXAMPLE 15

A mixture of 10.3 grams of methyl 4,4,4-trichlorobutyrate, 23.8 gms. of 1,1,1,7-tetrachloroheptane, 90 mls. of absolute ethanol containing 0.3 mole of ammonia, and a pre-reduced suspension of 0.3 gm. of platinum oxide in 5 mls. of alcohol is agitated vigorously in an atmosphere of hydrogen at room temperature. At the end of 9 hours approximately 8 liters of hydrogen have been absorbed. The reaction mixture is then diluted with 4 volumes of water and extracted with petroleum ether, and the extract is separated and dried. Upon fractional distillation of the extract 3.5 gms. of methyl 11-chlorohendecanoate are obtained, boiling in the range 130–135° C./1.5 mm., together with approximately 4 gms. of 1,14-dichlorotetradecane and approximately 3 gms. of dimethyl suberate.

The methyl 11-chlorohendecanoate is saponified by warming with an excess of 5N aqueous sodium hydroxide for 10 minutes after which the homogeneous reaction mixture is extracted with diethyl ether. The aqueous layer is acidified with hydrochloric acid and extracted with petroleum ether. Upon evaporation of the solvent, the crystalline 11-chlorohendecanoic acid is obtained which melts at 39.5° C. upon recrystallization.

*Analysis.*—Theory: percent C, 59.9; percent H, 9.53; percent Cl, 16.1. Found: percent C, 59.5; percent H, 9.36; percent Cl, 15.55.

The formation of the unsymmetrical compound, i. e., methyl 11-chlorohendecanoate, is believed to occur in the following steps:

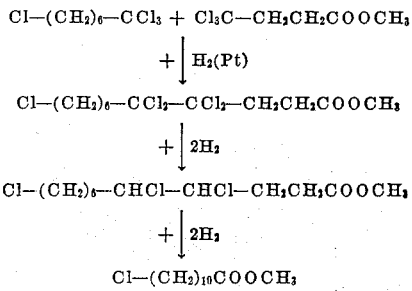

The preceding examples illustrate the method of our invention as applied to compounds containing the group —$CX_3$ where X is chlorine. The coupling of compounds containing one or more bromine atoms in the trihalomethyl group is illustrated by the following examples:

EXAMPLE 16

A mixture of 34.4 gms. of 2,4-dibromo-4,4-dichloro-butyl acetate, a pre-reduced suspension of 0.3 gm. of platinum oxide in 10 mls. of ethanol, and 27 mls. of alcoholic ammonia solution (62 gms./liter) is hydrogenated at room temperature and atmospheric pressure for 1 hour during which time 0.7 liter of hydrogen is absorbed. The reaction mixture is diluted with 4 volumes of water and extracted with a 50:50 mixture of diethyl ether and petroleum ether. The extract is dried and the solvent is removed by evaporation. The residue is recrystallized from diisopropyl ether to yield 3 gms. of a new compound, the diacetate of 2,7-dibromo-4,4,5,5-tetrachloro-1,8-octanediol, M. 100–1° C. Total halogen as Cl: Theory: 40.5%. Found: 40.3%.

EXAMPLE 17

A mixture of 31.1 gms. of 1,1,1-tribromo-2-hydroxy-2-methylpropane ("brometone"), a pre-reduced suspension of 0.3 gm. of platinum oxide in 10 mls. of ethanol and 30 mls. of alcoholic ammonia (62 gms./liter) is hydrogenated at room temperature and atmospheric pressure for 2 hours during which time 1.2 liters of hydrogen are absorbed. The reaction mixture is diluted with 4 volumes of water and extracted with several portions of petroleum ether. The extract is dried and frictionally distilled to remove the solvent and unreacted starting materials. The residue is recrystallized from di-isopropyl ether, yielding 5 gms. of a new 3,4-dibromo-2,5-dimethyl-3-hexenediol-2,5, M. 146.5–147° C.

| Analysis: | %C | %H | %Br |
|---|---|---|---|
| Found: | 32.17 | 4.60 | 54.17 |
| Theory: | 31.80 | 4.63 | 53.00 |

EXAMPLE 18

Ten and five-tenths grams of 6-trichlorohexane-nitrile are admixed with 10 mls. of alcoholic ammonia solution (62 gms./liter) and a pre-reduced suspension of 0.15 gm. of platinum oxide in 10 mls. of absolute ethanol containing 0.1 ml. of glacial acetic acid. The mixture is agitated in an atmosphere of hydrogen at room temperature for 15 minutes. At the end of this time 0.43 liters of hydrogen have been absorbed. The reaction mixture is purified as in previous examples to yield the new compound 6,6,7,7-tetrachlorododecanedinitrile, M. 105.2–105.7° C.

*Analysis.*—Found: N, 8.07%; theory: 7.90%.

Among the compounds producible by the present invention are those which conform to one or another of the following general formulae:

(A)      Y—R—$CX_2$—$CX_2$—R'—Y

R and R' are divalent organic radicals (similar or dissimilar) devoid of aromatic substituents and containing a chain of at least two carbon atoms; X is halogen; and Y is hydrogen, halogen, hydrocarbon, or hydrocarbon containing at least one hetero atom, and the Y's may be similar or dissimilar:

(B)      Y—R—CHX—CHX—R'—Y in which R, R', X, and Y have the same significance as in Formula A:

(C)      Y—R—$CH_2$—$CH_2$—R'—Y in which R, R' and Y have the same significance as in Formula A;

(D)      Y—R—CX=CX—R'—Y in which R, R', X and Y have the same significance as in Formula A.

Among the compounds corresponding to Formulae A, B, C and D are those in which Y is one of the radicals hydroxyl, alkoxy, carboxy, carbalkoxy, carbonitrilo, carbamyl, and acyloxy.

It will be apparent that a large number of chemicals can be synthesized by the present invention. Various of these chemicals will find application in many fields, for example, as high-boiling solvents, plasticizers, as intermediates for making resins, pharmaceuticals, etc.

While we have shown and described various embodiments of the invention, it is to be understood that the invention is susceptible to other modifications which appear within the spirit of the invention and the scope of the appended claims.

Having thus described our invention, what we claim and desire to protect by Letters Patent is:

1. Compounds having the general formula $(R-CH_2-CX_2-)_2$ wherein R is a solely aliphatic radical which is attached to the $CH_2$ through a carbon atom, and each X is selected from the group consisting of chlorine and bromine.
2. Compounds having the general formula $(Cl-R-CCl_2-)_2$ wherein R is a solely aliphatic hydrocarbon radical having a chain of at least two carbon atoms intervening between $CCl_2$ and the isolated chlorine.
3. 9,9,10,10-tetrachlorooctadecane.
4. 1,7,7,8,8,14-hexachlorotetradecane.
5. 1,8-diacetoxy-4,4,5,5-tetrachlorooctane.
6. Dimethyl 12,12,13,13 - tetrachlorotetracosanedioate.
7. An alkanedinitrile of the class defined in claim 1.
8. 6,6,7,7-tetrachlorododecanedinitrile.

ELBERT C. LADD.
HERBERT SARGENT.

References Cited in the file of this patent
UNITED STATES PATENTS

| Number | Name | Date |
|---|---|---|
| 2,377,669 | Brown et al. | June 5, 1945 |
| 2,422,528 | Cass et al. | June 17, 1947 |
| 2,425,426 | Joyce | Aug. 12, 1947 |

OTHER REFERENCES

Borsche et al, Ber. Deut. Chem., vol. 48, pp. 457–58, 850 (1915).

Busch et al, Ber. Deut. Chem., vol. 49, pp. 1063–71 (1916).

Kelber, Ber. Deut. Chem., vol. 50, pp. 305–10 (1917).

Prins, Rec. des Trav. Chim. des Pays Bas., vol. 51, pp. 1070–1 (1932).

Lespieau et al, Beilstein (Handbuch, 4th Ed., 2d Suppl.) vol. 1, page 193 (1941).